Sept. 2, 1941.      A. J. NICHOLAS             2,254,308
                     WATER VALVE
                  Filed Feb. 17, 1939
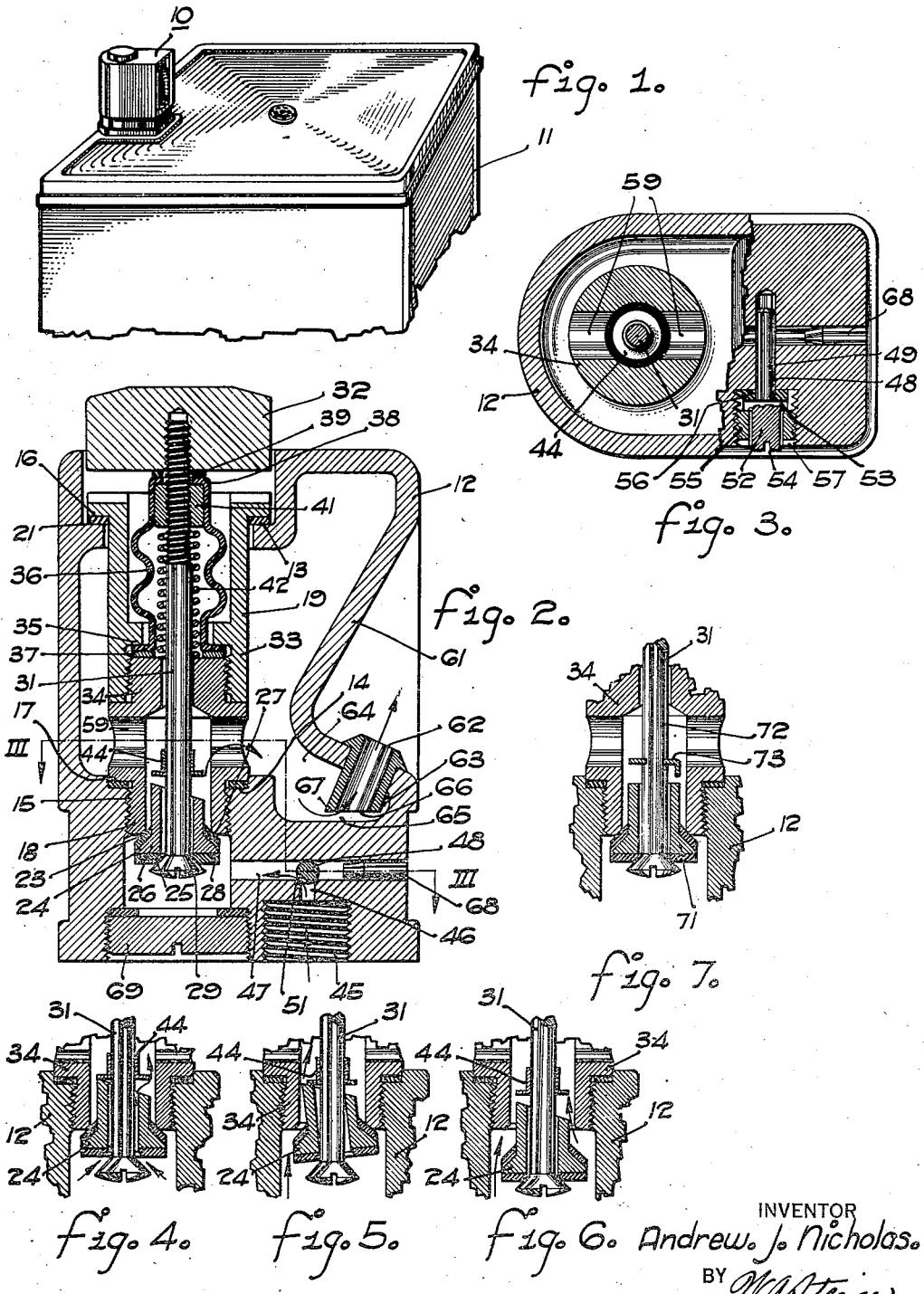
INVENTOR
Andrew J. Nicholas
BY
ATTORNEY Patented Sept. 2, 1941

2,254,308

UNITED STATES PATENT OFFICE 2,254,308

WATER VALVE

Andrew J. Nicholas, Springfield, Mass., assignor to Westinghouse Electric & Manufacturing Company, East Pittsburgh, Pa., a corporation of Pennsylvania Application February 17, 1939, Serial No. 256,892

5 Claims. (Cl. 277—36)

This invention relates to refrigeration apparatus and more especially to the bubbler heads of water coolers.

One object of the invention is to provide a bubbler valve mechanism which is smooth in operation.

Another object is to provide a bubbler valve mechanism which can be operated directly by finger pressure.

A further object is to provide a bubbler nozzle adjacent a control valve which nozzle provides a clear non-turbulent stream of water of moderate velocity.

These and other objects are effected by my invention as will be apparent from the following description and claims taken in connection with the accompanying drawing, forming a part of this application, in which:

Fig. 1 is a view in perspective of the bubbler head of this invention mounted upon a water cooler;

Fig. 2 is a vertical section of the bubbler head of Fig. 1 with the valve mechanism in the closed position;

Fig. 3 is a section on the line III—III of Fig. 2;

Fig. 4 is a partial section of the bubbler head showing the valve mechanism in a partially open position;

Fig. 5 is a partial vertical section of the bubbler head showing the valve mechanism in a more fully open position;

Fig. 6 is a partial vertical section of the bubbler head showing the valve mechanism in the fully open position; and, Fig. 7 is a modification of the valve mechanism shown in Fig. 2.

Referring specifically to the drawing for a detailed description of the invention, reference numeral 10 designates a bubbler head mounted on a water cooler 11. The bubbler head 10 comprises a casing 12 provided with two circular seats 13 and 14 and a threaded portion 15, which engage, respectively, two circular shoulders 16 and 17 and a threaded portion 18 of a spindle housing 19. The spindle housing 19 contains the valve mechanism of the bubbler head 10. A gasket 21 is provided between the seat 13 and the shoulder 16 and another gasket is provided between the seat 14 and the shoulder 17 to render the joints water-tight.

The spindle housing 19 has a central vertical passage therethrough with a chamfer at its base forming a valve seat 23. A cylindrical valve member 24 of the mushroom type engages the valve seat 23 of the spindle housing. The valve member 24 is also provided with a central passage therethrough having a chamfer at its base forming a valve seat 25. The valve member 24 comprises a metal core 26 upon which two rubber facing members 27 and 28 are vulcanized, one of which engages the valve seat 23 of the spindle housing and the other of which forms the valve seat 25 on the base of the valve member 24. A mushroom type valve head 29 engages the valve seat 25 and has a valve stem 31 passing upwardly through the valve member 24 and through the spindle housing 19. The valve stem 31 is threaded at its upper end, and an actuating knob 32 is screwed thereon.

The spindle housing 19 comprises an upper member 33 and a lower member 34 in screw threaded engagement, which members clamp the lower edge 35 of a tubular and corrugated rubber bellows element 36 and a washer 37 between them. The upper edge 38 of the rubber bellows 36 is clamped between a gasket 39 below the actuating knob 32 and a cylindrical nut 41 which also engages the screw threads of the valve stem 31. A helical compression spring 42 encircles the valve stem 31 and bears against the lower member 34 of the spindle housing 19 and the cylindrical nut 41, thereby urging the valve stem 31 and all elements connected thereto in an upward direction. The rubber bellows 36 forms a flexible seal between the valve stem 31 and the spindle housing 19. The spring 42 draws the valve members upwardly to close both the valve formed by the valve head 29 and the valve member 24, and the valve formed by the lower edge of the spindle housing 19 and the valve member 24. The upper face of the valve member 24 is cut at an angle and a collar 44 is secured to the valve stem slightly above the valve member 24.

The water enters the casing under pressure through a threaded inlet opening 45 by means of which the bubbler head may be screwed to a supply pipe (not shown). The inlet opening 45 communicates with the interior of the casing through two intersecting ducts 46 and 47 at the intersection of which is a flow regulating element comprising a rotatable pin 48 housed in a third intersecting duct 49. The pin 48 is provided with a kerf 51 in its side which kerf 51 registers with the ducts 46 and 47. The pin 48 is adapted to be rotated so that the kerf 51 establishes a more or less restricted passage between the ducts 46 and 47 thereby affording regulation of flow of water. The pin 48 has a head 52, a collar 53 thereon, and a screw driver slot 54 in the head by means of which the pin 48 can be rotated. The collar 53 of the pin 48 is secured in place by a threaded ferrule 55 which engages cooperating threads in an enlargement of the duct 49 and clamps the collar 53 against a gasket 56 adjacent the casing 12, thereby locking the collar 53 and the pin 48 in an immovable and leak-proof position in the duct 49. The ferrule 55 is also provided with slots 57 by means of which it may be rotated.

The function of the mechanism as thus far described is as follows: Assume that the bubbler head 10 is connected to the end of a supply pipe carrying water under pressure, and the various valves of the bubbler are closed. As the actuating knob 32 is depressed slightly, the valve head 29 leaves its seat 25 and a small quantity of water will flow through the central passage in the valve member 24. This position is shown in Fig. 4. The flow of water through the valve member 24 partially relieves the water pressure between the valve mechanism and the flow restrictor 48. As the actuating knob 32 is further depressed, the collar 44 strikes the upper edge of the valve member 24 and tilts it on its seat 23 as shown in Fig. 5. It will be noted that the movement of the valve member 24 is not opposed by the full pressure of the water in the pipe as the pressure has already been relieved by the opening of the valve head 29. The tilting of the valve member 24 results in an additional stream of water flowing around the valve member 24 and of a further reduction of pressure between the valve mechanism and the flow restricting valve. A further downward movement of the actuating knob 32 moves the valve member 24 downwardly against the now greatly reduced water pressure beneath the valve and the full stream of water will commence to flow through the valve mechanism limited only by the restrictor 48. This position of the valve is shown in Fig. 6.

The water flows through lateral openings 59 in the spindle housing 19 into the hollow interior of the bubbler casing 12. This casing is generally of the shape of a rectangular block, one vertical wall of which, however, is rounded. The wall opposite the rounded wall has an impressed portion 61 in the lower portion of which a nozzle 62 is inserted in a manner to throw a stream of water obliquely upward. The particular depressed portion 61 and nozzle 62 is designed to comply with health regulations which require that the nozzle be sheltered by an overhanging portion to prevent contaminating matter from dropping vertically into the nozzle.

With such a construction, the mouth of the person using the bubbler must of necessity be placed at some distance from the nozzle, and to facilitate the drinking, it is essential that the nozzle throw a solid and steady stream of water and one that preferably is clear. In unitary structures, such as applicant's, this flow is difficult to obtain as the valve mechanism is close to the nozzle and sets up a turbulence in the flow of water which tends to cause a stream issuing from the nozzle to separate into drops and slugs of water which are unsightly and make drinking difficult.

In applicant's device, this tendency of the stream to divide, is counteracted by the particular entrance opening in the nozzle and the particular chamber into which the entrance of the nozzle projects. This chamber 63 comprises a cavity having a large entrance opening 64 above the bottom 65 of the cavity into which the nozzle 62 projects at approximately right angles to the entering flow of water. The entrance opening 66 of the nozzle 62 is cut at an angle so that a lip 67 extends in a direction to shield the entrance opening 66 of the nozzle 62 from the entering flow of water. The reason why this structure produces a clear and steady stream of water is not completely understood. It was found, however, that if the entrance 66 to the nozzle 62 is cut squarely or is sloped in the opposite direction from that shown, a turbulent flow of water results. It was further found that variations in the shape of the bottom 65 of the chamber 63 have little influence on the form of the stream, but that the edges of the chamber 63 adjacent to the entrance 66 of the nozzle 62 are preferably rounded. The plugs 68 and 69 are closure devices which are required for structural reasons.

Fig. 7 shows a modification of the valve mechanism. The valve member 71 and the valve stem 72 correspond in function to the valve member 24 and valve stem 31 in Fig. 2. The upper surface of the valve member 71 is horizontal and the valve stem has a projecting finger 73 secured above the valve member 71 which finger 73 tilts the valve member 71 on its seat much in the same manner as the valve mechanism previously described.

From the above, it will be apparent that this invention provides a bubbler head having a flow restricting valve, an actuating valve, and a nozzle in one unitary structure which emits a clear stream of water at moderate velocity and comprises a smooth operating valve which may be actuated by finger pressure without any intervening leverage.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In a valve, the combination of a plurality of coaxial valve members seated upon one another and adapted to be independently operated, a stem on the central valve member for moving it from its seat, and means on said stem for tilting the valve member adjacent the central valve member on its seat using a portion of said seat as a fulcrum after moving the central valve member from its seat.

2. In a valve, the combination of a plurality of coaxial valve members comprising a valve seat, a valve head for said seat, a second valve seat, said second valve seat being located in said valve head, a second valve head, said second valve head cooperating with said second valve seat, and means operative when said valve is in the closed position against fluid pressure for moving one of said valve heads from its seat and tilting the other of said valve heads on its seat to provide a passage for said fluid between only a portion of said last-named valve head and valve seat.

3. In a valve, the combination of a valve seat and a plurality of coaxial valve members, at least one of which comprises a second seat for another of said members, and common means for actuating said valve members, said means being secured to one of said members and adapted to engage another of said members to exert a force directed mainly at one edge of the valve member, said last-named member being free to pivot on one portion of its valve seat under said force.

4. In a valve, the combination of a casing, a valve seat in said casing, a valve head adapted to cooperate with said valve seat, an opening in said valve head providing a second valve seat, a second valve head adapted to cooperate with said second valve seat, an actuating rod secured to said second valve head and biased to urge the same on said second valve seat, said rod passing through the opening in the first-named valve head, said rod being smaller than said opening, said actuating rod engaging said first-named valve head adjacent one edge thereof to exert a force to tilt said first-named valve head on one edge of its seat and thereafter move said first-named valve head completely from its seat, said projection being positioned on said rod to effect said tilting after said second-named valve head is moved from its seat.

5. In a valve, the combination of a casing, a valve seat in said casing, a valve head adapted to cooperate with said valve seat, an opening in said valve head providing a second valve seat, a projection on said valve head on one side of said opening and extending in the direction of the closing movement of said valve head, a second valve head adapted to cooperate with said second valve seat, an actuating rod secured to said second valve head and urged to bias said second valve head on said second valve seat, said rod passing through the opening in the first-named valve head and being substantially smaller than said opening, said second valve seat being so positioned on said first-named valve head that said second-named valve head biases said first-named valve head on its seat, said actuating rod having a collar formed thereon and adapted to engage the projection formed on said first-named valve head after the second-named valve head leaves said second-named seat to tilt said first-named valve head on one edge of its valve seat and upon further movement of said actuating rod to completely remove said first-named valve head from its valve seat.

ANDREW J. NICHOLAS.